United States Patent
Nam et al.

(10) Patent No.: US 11,613,837 B2
(45) Date of Patent: Mar. 28, 2023

(54) DRIVING DEVICE FOR WASHING MACHINE

(71) Applicant: LG Electronics Inc., Seoul (KR)

(72) Inventors: Hyoung Uk Nam, Seoul (KR); Hyojin Ko, Seoul (KR); Jin Hong, Seoul (KR)

(73) Assignee: LG Electronics Inc., Seoul (KR)

(*) Notice: Subject to any disclaimer, the term of this patent is extended or adjusted under 35 U.S.C. 154(b) by 520 days.

(21) Appl. No.: 16/752,383

(22) Filed: Jan. 24, 2020

(65) Prior Publication Data

US 2020/0240067 A1 Jul. 30, 2020

(30) Foreign Application Priority Data

Jan. 25, 2019 (KR) .................. 10-2019-0010123

(51) Int. Cl.
| | | |
|---|---|---|
| *D06F 37/30* | (2020.01) | |
| *D06F 37/36* | (2006.01) | |
| *D06F 37/40* | (2006.01) | |
| *H02K 29/08* | (2006.01) | |
| *D06F 105/48* | (2020.01) | |

(Continued)

(52) U.S. Cl.
CPC ............ *D06F 37/304* (2013.01); *D06F 37/36* (2013.01); *D06F 37/40* (2013.01); *H02K 29/08* (2013.01);
(Continued)

(58) Field of Classification Search
CPC ........ D06F 37/304; D06F 37/36; H02K 29/08
See application file for complete search history.

(56) References Cited

U.S. PATENT DOCUMENTS 8,242,653 B2 * 8/2012 Ichiyama ............... H02K 21/38
310/156.55
9,197,119 B2 * 11/2015 Shiga .................... H02K 29/08
(Continued)

FOREIGN PATENT DOCUMENTS

CN 203339913 12/2013
CN 105986415 10/2016
(Continued)

OTHER PUBLICATIONS

Machine translation of CN203339913U, dated Dec. 2013. (Year: 2013).*
(Continued)

*Primary Examiner* — Joseph L. Perrin
*Assistant Examiner* — Kevin G Lee
(74) *Attorney, Agent, or Firm* — Fish & Richardson P.C.

(57) ABSTRACT

A driving device for a washing machine includes: a shaft including an inner shaft and an outer shaft surrounding the inner shaft; a motor assembly including a stator, a rotor that surrounds the stator, a modulator that surrounds the rotor, and a magnetic gear rotating body that surrounds the modulator; a first fixation body that connects between the inner shaft and the magnetic gear rotating body; a second fixation body having one end connected to the stator and the other end connected to a tub; and an electronic clutch that disconnects the outer shat and the rotor or connects the inner shaft and the rotor according to an operation mode of the washing machine. The modulator adjusts a speed and torque of the magnetic gear rotating body. The driving device may make a motor drive area highly efficient and may reduce electric consumption.

18 Claims, 3 Drawing Sheets

(51) Int. Cl.
  *D06F 33/36* (2020.01)
  *D06F 33/40* (2020.01)
  *D06F 23/00* (2006.01)
  *F16D 28/00* (2006.01)
  *H02K 7/108* (2006.01)
  *H02K 49/10* (2006.01)

(52) U.S. Cl.
  CPC .............. *D06F 23/00* (2013.01); *D06F 33/36* (2020.02); *D06F 33/40* (2020.02); *D06F 2105/48* (2020.02); *F16D 28/00* (2013.01); *H02K 7/1085* (2013.01); *H02K 49/102* (2013.01)

(56) References Cited

U.S. PATENT DOCUMENTS

| | | | | |
|---|---|---|---|---|
| 10,910,964 | B2* | 2/2021 | Inoue | H02K 7/11 |
| 2019/0190413 | A1* | 6/2019 | Ueno | H02K 11/30 |

FOREIGN PATENT DOCUMENTS

| | | |
|---|---|---|
| WO | WO2016024777 | 2/2016 |
| WO | WO2016171439 | 10/2016 |

OTHER PUBLICATIONS

Extended European Search Report in European Appln. No. 20153564.8, dated May 27, 2020, 11 pages.

\* cited by examiner

DRIVING DEVICE FOR WASHING MACHINE

CROSS-REFERENCE TO RELATED APPLICATION

This application claims priority to and the benefit of Korean Patent Application No. 10-2019-0010123, filed in Korea on Jan. 25, 2019, the disclosure of which is incorporated herein by reference in its entirety.

BACKGROUND

1. Field

The present disclosure relates to a driving device for a washing machine.

2. Background

Washing machines are rotated by a motor in which a rotating shaft is placed perpendicularly. They are classified according to an object subject to rotation during washing, rinsing and dehydrating procedures.

During the washing and rinsing procedures, a pulsator provided on the floor of a space, in which clothes to be washed are accommodated, is rotated in a washing machine.

During the dehydrating procedure, a drum that is a space in which clothes to be washed are accommodated is wholly rotated. The drum is rotatably installed in a tub capable of containing water. The tub is provided in a main body of the washing machine.

A motor of the washing machine may be driven under different driving conditions at the time of wash and dehydration. For example, the motor is driven at low speeds with high torque during the washing procedure. The motor is driven with low torque at high speeds during the dehydrating procedure. In this case, a speed during the dehydrating procedure is set to approximately 25 times higher than a speed during the washing procedure.

The motor, as described above, is low efficient during the washing procedure and is highly efficient during the dehydrating procedure. Accordingly, the motor is inefficient and consumes much energy in the aspect of an entire washing course.

If there is any way to improve efficiency during both the washing and dehydrating procedures, the electric consumption of the washing machine may be decreased while the energy efficiency rate is increased.

However, according to properties of a motor, there is no method of improving efficiency of the motor at low speeds as well as high speeds. Accordingly, there is a growing need for a technical solution to the above-described problem.

As a prior art, a speed reduction device of a washing machine is disclosed in Korean Patent Publication No. 10-1999-0031188 (published on May 6, 1999).

The speed reduction device of a washing machine of the related art has a structure in which upper and lower covers come into close contact with upper and lower sides of a sun gear, and has the advantage of preventing upward and downward flows and reducing noise that are caused by an impellent power.

However, a technical method of improving efficiency of a motor during both the washing and dehydrating procedures, i.e., at the time of low-speed driving and high-speed driving is not disclosed in the prior art document.

SUMMARY

The present disclosure is directed to providing a driving device for a washing machine that may make a motor drive area highly efficient, thereby reducing energy consumption.

The present disclosure is directed to providing a driving device for a washing machine in which a motor may be scaled down, thereby making a product more lightweight.

The present disclosure is directed to providing a driving device for a washing machine that may be applied to a large-capacity washing machine with an increase in torque according to a reduction gear ratio.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

According to one aspect of the subject matter described in the present disclosure, a driving device for a washing machine may reduce electric consumption of a motor, which accounts for a large share of the entire electric consumption of the washing machine, by allowing the motor to operate at a constant speed during washing and dehydrating procedures and by making a motor drive area highly efficient.

To this end, the exemplary driving device for a washing machine includes a shaft, a motor assembly, a first fixation body, a second fixation body, and an electronic clutch.

The shaft includes an inner shaft, and an outer shaft that is placed to wrap the inner shaft.

The motor assembly includes a stator, rotor, a modulator, and a magnetic gear rotating body.

The rotor is placed to wrap the stator and is rotated.

The modulator may be placed to surround and wrap the rotor.

The magnetic gear rotating body is placed to wrap the modulator, and speed and torque of the magnetic gear rotating body are adjusted by the modulator in order for the magnetic gear rotating body to rotate.

Additionally, the driving device for a washing machine includes a first fixation body that connects the inner shat and the magnetic gear rotating body.

Further, the driving device for a washing machine includes a second fixation body, one end of which is connected to the stator and the other end of which is connected to a tub, and which fixes the modulator.

Furthermore, the driving device for a washing machine includes an electronic clutch that disconnects the outer shat and the rotor, or that connects the inner shaft and the rotor, according to an operation mode of the washing machine.

In this case, as for the motor assembly, a first gap may be formed between the stator and the rotor, a second gap may be formed between the rotor and the modulator, and a third gap may be formed between the modulator and the magnetic gear rotating body.

Additionally, the rotor may include a first magnet that is placed near the stator, and a second magnet that faces the first magnet and that is placed near the modulator.

The modulator, which is made of an electrical steel sheet, may have a cross section in which predetermined spaces are formed circumferentially at preset intervals.

The modulator is provided with a magnetic circuit made of an electrical steel sheet to produce a magnetic gear effect.

The modulator may be placed to surround and wrap the second magnet of the rotor with the second gap between the modulator and the rotor and to have a ring-shaped cross section.

In this case, predetermined spaces are formed circumferentially at preset intervals on the ring-shaped cross section to provide a magnetic gear effect.

Additionally, as for the magnetic gear rotating body, magnets having different polarities may be alternately placed and formed along a circumferential direction at a position that faces the modulator.

Accordingly, the magnetic gear rotating body may rotate at a position where the magnetic gear rotating body wraps the modulator with the third gap between the magnetic gear rotating body and the modulator.

The magnetic gear rotating body may generate lower-speed higher-torque output than the rotor while speed and torque of the magnetic gear rotating body are adjusted by the modulator.

According to another aspect of the subject matter described in the present disclosure, the driving device for a washing machine may reduce electric consumption by allowing the motor to operate at a constant speed during the washing and dehydrating procedures and by making a motor drive area highly efficient. Further, the driving device for a washing machine may use a deceleration gear during the washing procedure and may have a shaft structure in which the deceleration gear may be detached during the dehydrating procedure.

To this end, the inner shaft may be connected to a pulsator of the washing machine, and the outer shaft may be connected to the tub of the washing machine.

The electronic clutch may disconnect the outer shat and the rotor, and may rotate the pulsator in a low-speed high-torque mode, in a wash mode of the washing machine.

Additionally, the electronic clutch may couple the outer shaft and the rotor, and may rotate the tub in a high-speed low-torque mode, in a dehydration mode of the washing machine.

One end of the first fixation body may be fixed to the magnetic gear rotating body and the other end of the first fixation body is connected to the inner shaft, and the pulsator may be connected to a distal end of the inner shaft.

The second fixation body includes a stator fixer connected with and fixed to the stator, and a modulator fixer that extends from the stator fixer and that fixes the modulator.

The modulator fixer may extend from the stator fixer toward the tub, and may be inserted and placed between the rotor and the magnetic gear rotating body.

Accordingly, the driving device for a washing machine may make a motor drive area highly efficient and may reduce electric consumption. Further, the driving device for a washing machine may allow a product to become more lightweight and may be applied to a large-capacity washing machine with an increase in torque according to a reduction gear ratio.

The present disclosure may provide a gear device for improving an energy efficiency rate of a washing machine, and, in particular, may make a motor drive area highly efficient, thereby reducing electric consumption.

The present disclosure may allow a motor to be scaled down, thereby making a product more lightweight.

The present disclosure may optionally apply a magnetic speed reduction gear at the time of wash and dehydration while allowing the motor to be driven at a constant speed during the washing and dehydrating procedures, thereby implementing low-speed high-torque driving and high-speed low-torque driving. Additionally, the present disclosure may be applied to a large-capacity washing machine with an increase in torque according to a reduction gear ratio.

Detailed effects of the present disclosure are described together with the above-described effects in the detailed description of the disclosure.

BRIEF DESCRIPTION OF THE DRAWINGS

Embodiments will be described in detail with reference to the following drawings, wherein.

DETAILED DESCRIPTION

Figure 1:
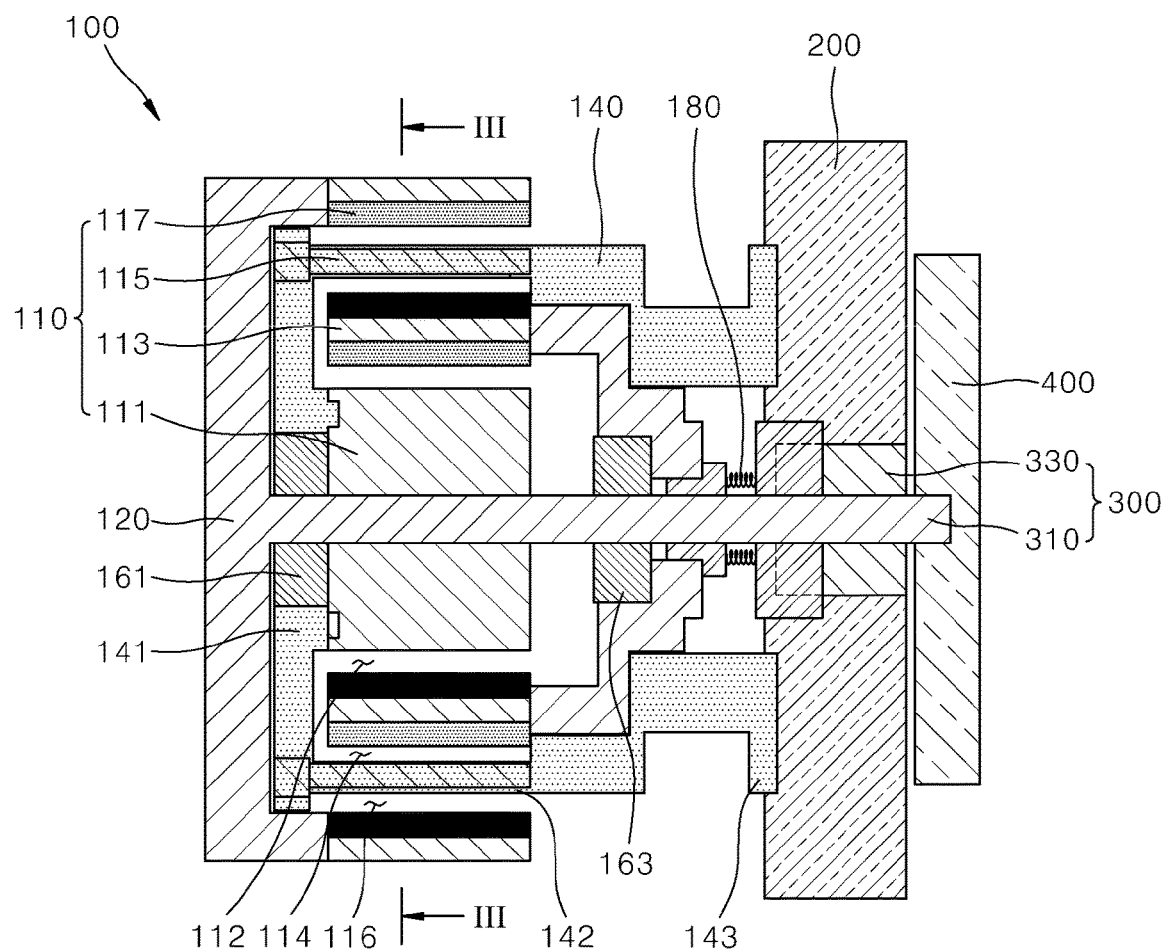
FIG. 1 is a cross-sectional view briefly illustrating an exemplary driving device for a washing machine.

Embodiments of the present disclosure are specifically described with reference to the accompanying drawings hereunder such that one having ordinary skill in the art to which the present disclosure pertains may easily implement the disclosure. The present disclosure may be implemented in various different forms and should not be limited to the embodiments set forth herein.

In order for the present disclosure to be clearly understood, description irrelevant to the disclosure is omitted, and, throughout the specification, like reference numerals denote like elements. Additionally, some embodiments of the disclosure are specifically described with reference to the accompanying drawings. Like elements may be given the same reference numeral although they are illustrated in different drawings. Further, detailed description of known configurations and functions in relation to the disclosure is omitted if it is deemed to make the gist of the present disclosure unnecessarily vague.

When a component is described as being "connected," "coupled" or "connected" to another component, the component may be directly connected or able to be connected to another component; however, it is also to be understood that an additional component may be "interposed" between the two components, or the two components may be "connected," "coupled" or "connected" through an additional component.

The terms "A or B", "at least one of A or/and B", or "one or more of A or/and B" as used herein include all possible combinations of items enumerated with them. For example, "A or B", "at least one of A and B", or "at least one of A or B" means (1) including at least one A, (2) including at least one B, or (3) including both at least one A and at least one B.

Figure 2:
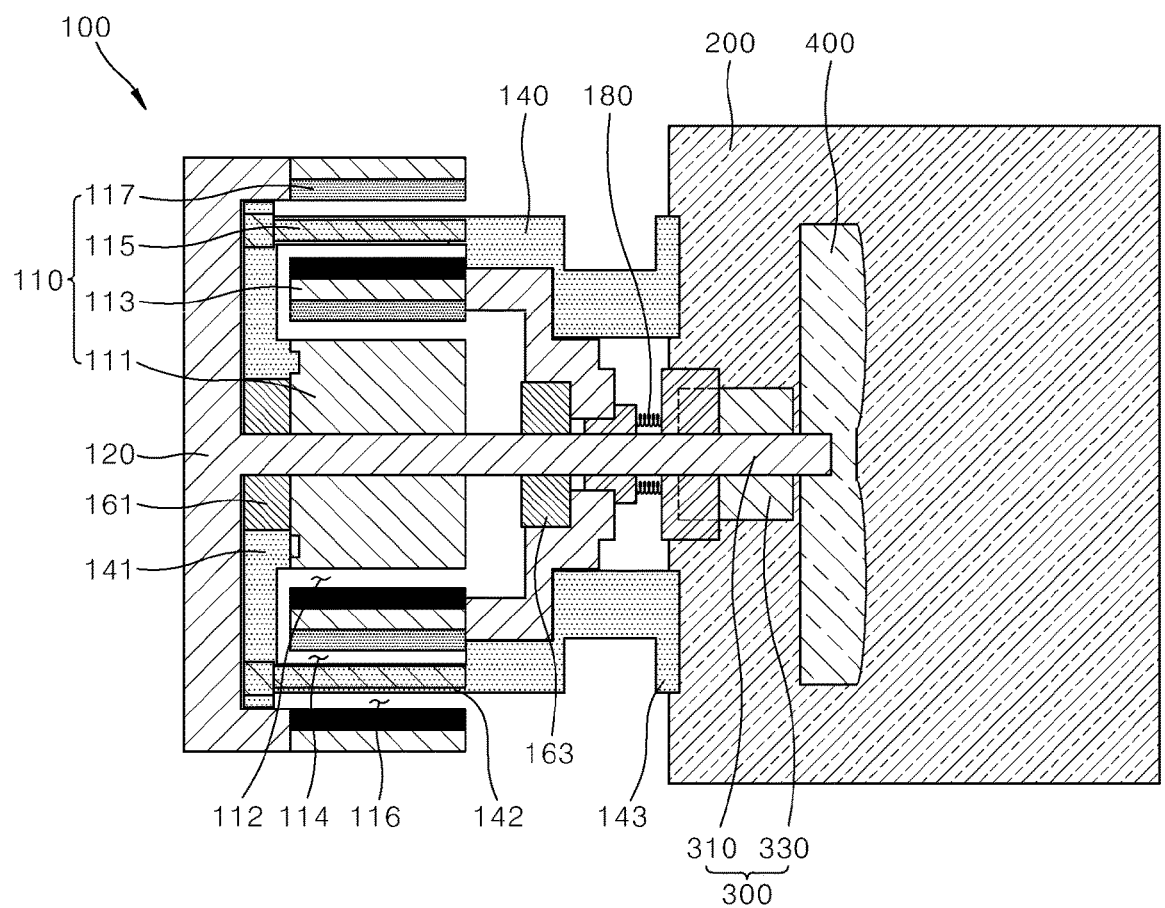
FIG. 2 is a cross-sectional view illustrating a structure in which a tub and a pulsator are coupled to an exemplary driving device for a washing machine.

FIG. 1 is a cross-sectional view briefly illustrating an exemplary driving device for a washing machine, and FIG. 2 is a cross-sectional view illustrating a structure in which a tub and a pulsator are coupled to an exemplary driving device for a washing machine.

Referring to FIGS. 1 and 2, the driving device for a washing machine 100 includes a shaft 300, a motor assembly 110, a first fixation body 120, a second fixation body 140, and an electronic clutch 180.

The shaft 300 receives a rotational force from the motor assembly 110 to rotate.

Figure 4:
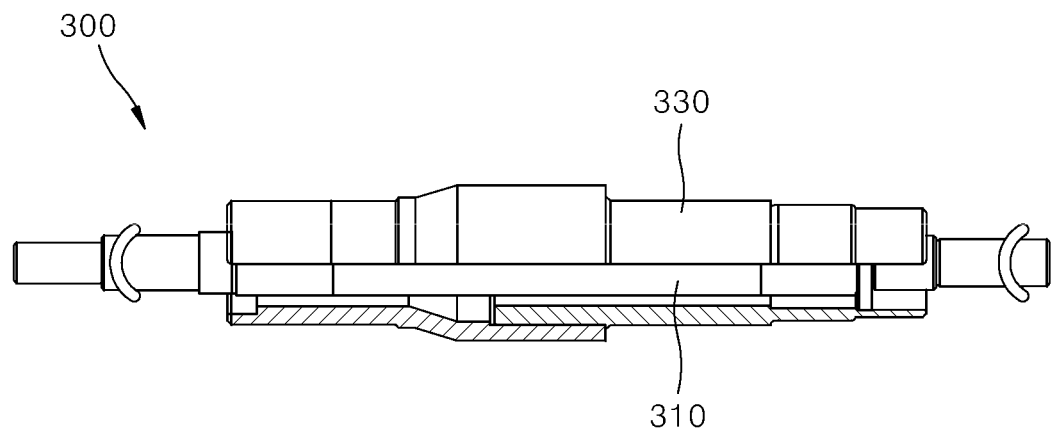
FIG. 4 is a partial view illustrating a shaft applied to an exemplary driving device for a washing machine.

Specifically, the shaft 300, as illustrated in FIG. 4, includes an inner shaft 310 and an outer shaft 330.

The inner shaft 310 may be placed at an inner center of the shaft 300, and the inner shaft 310 and the outer shaft 330 may be individually rotated.

Referring to FIG. 1, in the exemplary driving device for a washing machine 100, the inner shaft 310 is connected to a pulsator 400 of the washing machine, and supplies a rotational force to the pulsator 400.

The pulsator 400 is a member that is rotated when the washing machine washes clothes.

Accordingly, the inner shaft 310 is configures to make rotational movements when the washing machine washes clothes.

The outer shaft 330, as illustrated in FIG. 4, surrounds and wraps the inner shaft 310, and is formed outside of the inner shaft 310 such that the outer shaft 330 and the inner shaft 310 are individually rotated.

Referring to FIG. 1, in the exemplary driving device for a washing machine 100, the outer shaft 330 is connected to a tub 200 of the washing machine. Additionally, the outer shaft 330 supplies a rotational force to the tub 200.

The tub 200 is a member that is rotated when the washing machine dehydrates clothes.

Accordingly, the outer shaft 330 is configured to make rotational movements when the washing machine dehydrates clothes.

The motor assembly 110 receives power from the outside and supplies a rotation force required of a double-structured shaft 300 that includes the inner shaft 310 and the outer shaft 330.

The exemplary motor assembly 110 allows a motor to be driven at a constant speed in a low-speed high-torque wash mode and in a high-speed low-torque dehydration mode, thereby enabling highly efficient driving of the motor.

In other words, at the time of wash and dehydration, the motor assembly 110 allows the motor to be driven at a constant speed, thereby reducing electricity consumption. Additionally, the motor assembly 110 optionally applies functions of a magnetic deceleration gear at the time of wash and dehydration, while allowing the motor to be driven at a constant speed, thereby enabling low-speed high-torque driving and high-speed low-torque driving.

Referring to FIG. 1, the motor assembly 110 includes a stator 111, a rotor 113, a modulator 115, and a magnetic gear rotating body 117.

The stator 111 is placed along an inner center of the motor assembly 110, and is connected with the shaft 300 at the same center.

The rotor 113 is placed to wrap the stator 111 outside of the stator 111.

Additionally, the rotor 113 is configured to rotate around the stator 111.

Accordingly, a first gap 112 is formed between the stator 111 and the rotor 113.

The gap denotes an air gap and a certain space formed between the stator 111 and the rotor 113.

Figure 3:
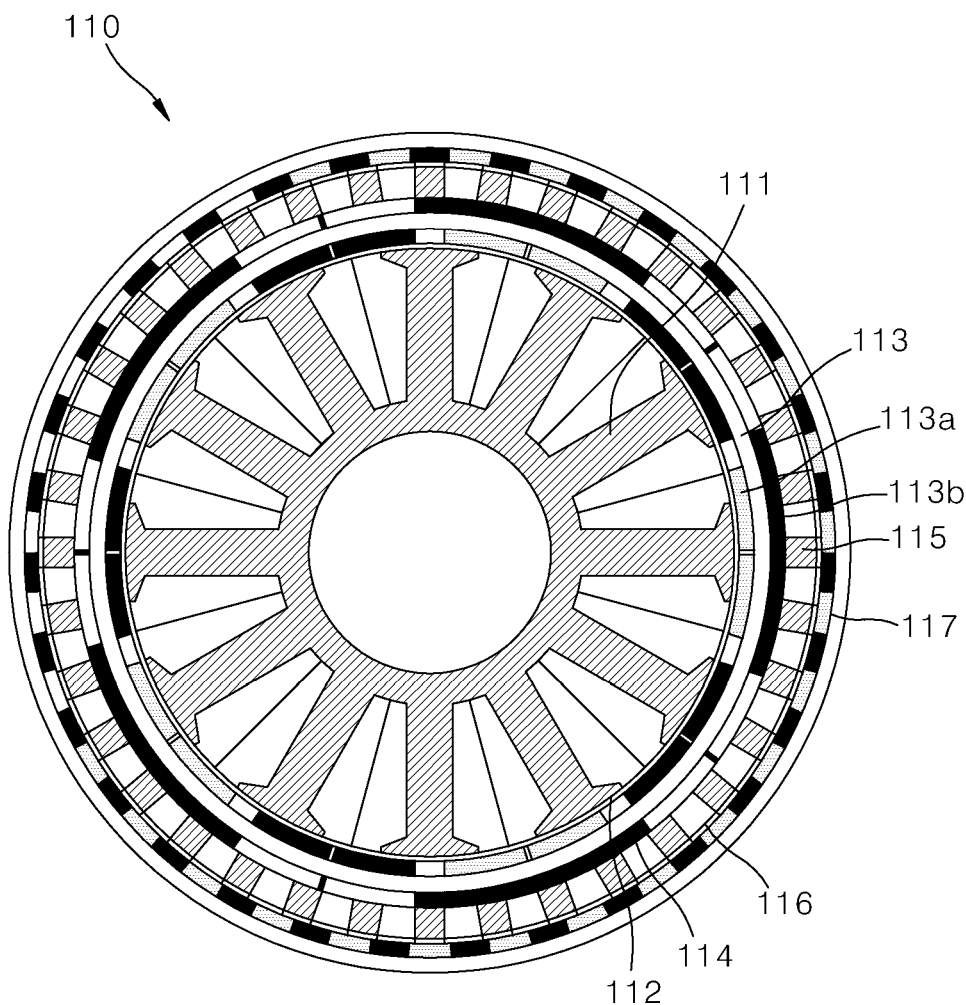
FIG. 3 is an exploded cross-sectional view illustrating section "III-III" in FIG. 1.

FIG. 3 is an exploded cross-sectional view illustrating section "□-□" in FIG. 1. FIG. 3 specifically shows a structure in which the stator 111 and the rotor 113 are placed, and a position of the first gap 112.

The rotor 113 has a plurality of magnets. Specifically, the rotor 113 includes first and second magnets 113a, 113b (see FIG. 3).

The first magnet 113a (see FIG. 3) is placed near the stator 111.

The second magnet 113b (see FIG. 3) is placed near the modulator 115 while facing the first magnet 113a (see FIG. 3).

The modulator 115 is placed to surround and wrap the rotor 113.

A second gap 114 is formed between the modulator 115 and the rotor 113.

Specifically, the modulator 115, as illustrated in FIG. 3, has a ring-shaped cross section to wrap the rotor 113 outside of the second magnet 113b (see FIG. 3).

The modulator 115 may be made of an electrical steel sheet to produce a magnetic gear effect.

Referring to FIG. 3, the modulator 115 has a cross section in which a predetermined space is formed circumferentially at preset intervals, and the second gap 114 is formed between the modulator 115 and the rotor 113.

The magnetic gear rotating body 117 is placed to wrap the modulator 115.

Specifically, the magnetic gear rotating body 117 may be formed by alternately placing magnets that have different polarities along a circumferential direction at a position that faces the modulator 115.

With the above-described structure, the magnetic gear rotating body 117 rotates outside of the modulator 115 that is placed to wrap the rotor 113 to produce the magnetic gear effect.

However, unlike the rotor 113, the magnetic gear rotating body 117 may be adjusted in speed and torque by the modulator 115 to rotate.

For example, speed and torque of the magnetic gear rotating body 117 may be adjusted by the modulator 115, and the magnetic gear rotating body 117 may rotate in a lower-speed higher-torque mode than the rotor 113.

Further, a third gap 116 is formed between the modulator 115 and the magnetic gear rotating body 117.

As described above, in the exemplary driving device for a washing machine 100, the motor assembly 110 has three gaps, i.e., the first, second and third gaps 112, 114, 116.

The first fixation body 120 denotes a body that connects between the inner shaft 310 and the magnetic gear rotating body 117.

The exemplary driving device for a washing machine 100 includes two fixation bodies. The first fixation body 120, which is one of the two fixation bodies, fixes the inner shaft 310 and the magnetic gear rotating body 117.

Specifically, referring to FIGS. 1 and 2, one end of the first fixation body 120 is fixed to the magnetic gear rotating body 117, and the other end of the first fixation body 120 is connected with the inner shaft 310.

Additionally, the pulsator 400 is connected to a distal end of the inner shaft 310.

Accordingly, when the outer shaft 330 and the rotor 113 are disconnected in a wash mode of the washing machine, low-speed high-torque output from the magnetic gear rotating body 117 is delivered to the pulsator 400 through the inner shaft 310.

By doing so, the driving device for a washing machine may supply required low-speed high-torque output without changing a driving speed of a motor. The above-described mode conversion is specifically described in relation to a below-described electronic clutch.

The second fixation body 140 fixes the stator 111 and the modulator 115.

The exemplary driving device for a washing machine 100 includes two fixation bodies, and the second fixation body 120 denotes the rest body of the two fixation bodies.

Specifically, referring to FIGS. 1 and 2, the second fixation body 140 includes a stator fixer 141 and a modulator fixer 142.

The stator fixer 141 refers to a portion that faces the first fixation body 120 and that connects with the stator 111 inside the first fixation body 120.

In this case, at least one bearing 161 is interposed between a distal end of the stator fixer 141, and the first fixation body 120, and reduces friction caused during operations of the stator fixer 141 and the first fixation body 120.

The modulator fixer 142 extends toward the tub 200 from the stator fixer 141.

Specifically, the modulator fixer 142 is inserted lengthwise along a space between the rotor 113 and the magnetic gear rotating body 117 and fixes the modulator 115 between the rotor 113 and the magnetic gear rotating body 117.

Additionally, the modulator fixer 142 may further include a supporter 143 that protrudes from a distal end of the modulator fixer 142 to the tub 200. A shape of the supporter 143 is not limited to the illustrated shape, and the supporter 143 may have a shape different from the illustrated shape.

Additionally, at least one bearing 161 may be interposed between the second fixation body 140 and the first fixation body 120 and may reduce friction. Another bearing 163 may be further provided at a position different from the position between the second fixation body 140 and the first fixation body 120.

For example, at least one bearing 163 may be further interposed between the inner shaft 310 and the rotor 113.

The electronic clutch 180 disconnects or couples the outer shaft 330 and the rotor 113, and adjusts low-speed high-torque driving, or high-speed low-torque driving, according to an operation mode of the washing machine.

Operations of the exemplary driving device for a washing machine 100 are described.

First, when a user inputs a wash mode signal in a wash mode of the washing machine, the electronic clutch 180 separates the outer shaft 330 and the rotor 113.

By doing so, low-speed high-torque output from the magnetic gear rotating body 117 is delivered to the pulsator 400 through the inner shaft 310.

Thus, the washing machine may wash clothes at low speeds with high torque without changing a driving speed of the motor assembly 110.

When the user inputs a dehydration mode signal in a dehydration mode of the washing machine, the electronic clutch 180 couples the outer shaft 330 and the rotor 113.

By doing so, the tub 200 may receive output from the rotor 113 as it is, and may perform dehydration mode driving at high speeds with low torque.

According to the above described configurations and operations of the embodiment of the disclosure, a gear device for improving an energy efficiency grade of a washing machine is provided. In particular, efficiency of a motor drive area may be enhanced, thereby promoting a reduction in energy consumption.

Further, according to the above described configurations and operations of the embodiment of the disclosure, a motor may be scaled down, thereby making a product more lightweight.

Furthermore, according to the above described configurations and operations of the embodiment of the disclosure, the driving device for a washing machine may optionally apply the magnetic deceleration gear at the time of wash and dehydration while allowing a motor to be driven at a constant speed at the time of wash and dehydration, thereby enabling low-speed high-torque driving, and high-speed low-torque driving. Furthermore, the driving device for a washing machine may be applied to a large-capacity washing machine with an increase in torque according to a reduction gear ratio.

The present disclosure has been described with reference to the embodiments illustrated in the drawings. However, the disclosure is not limited to the embodiments and the drawings set forth herein. Further, various modifications may be made by one having ordinary skill in the art within the scope of the technical spirit of the disclosure. Furthermore, though not explicitly described during description of the embodiments of the disclosure, effects and predictable effects according to the configuration of the disclosure should be included in the scope of the disclosure.

DESCRIPTION OF THE SYMBOLS

100: Driving device for washing machine
110: Motor assembly
111: Stator
112: First gap
113: Rotor
113a, 113b: First, second magnets
114: Second gap
115: Modulator
116: Third gap
117: Magnetic gear rotating body
120: First fixation body
140: Second fixation body
141: Stator fixer
142: Modulator fixer
161: First bearing
163: Second bearing
180: Electronic clutch
200: Tub
300: Shaft
310: Inner shaft
330: Outer shaft
400: Pulsator

What is claimed is:

1. A driving device for a washing machine, comprising:
a shaft comprising an inner shaft and an outer shaft that surrounds the inner shaft;
a motor assembly comprising:
  a stator,
  a rotor that surrounds the stator and that is configured to rotate relative to the stator,
  a modulator that surrounds the rotor, and
  a magnetic gear rotating body that surrounds the modulator, wherein the modulator is configured to adjust a rotating speed of the magnetic gear rotating body and a torque of the magnetic gear rotating body;
a first fixation body that connects the inner shaft to the magnetic gear rotating body;
a second fixation body that fixes the modulator to a tub of the washing machine, the second fixation body having a first end connected to the stator and a second end connected to the tub; and
an electronic clutch that is configured to, according to an operation mode of the washing machine, disconnect the outer shaft from the rotor or connect the inner shaft to the rotor,
wherein the rotor is disposed radially between the stator and the modulator, the rotor comprising:

a first magnet that faces the stator, and a second magnet that is disposed radially outward relative to the first magnet and that faces the modulator.

2. The driving device of claim 1, wherein the motor assembly includes:

a first gap defined between the stator and the rotor;

a second gap defined between the rotor and the modulator; and a third gap defined between the modulator and the magnetic gear rotating body.

3. The driving device of claim 1, wherein the modulator comprises one or more electrical steel sheets.

4. The driving device of claim 3, wherein the magnetic gear rotating body comprises a plurality of magnets that face the modulator, that have different polarities from one another, and that are alternately arranged along a circumferential direction of the rotor.

5. The driving device of claim 4, wherein the modulator is configured to, based on adjusting the rotating speed and the torque of the magnetic gear rotating body, decrease a speed of the rotor and increase a torque of the rotor.

6. The driving device of claim 1, wherein the inner shaft connected to a pulsator of the washing machine.

7. The driving device of claim 6, wherein the outer shaft is connected to the tub of the washing machine.

8. The driving device of claim 7, wherein the electronic clutch is configured to, based on the operation mode being a wash mode, disconnect the outer shaft from the rotor and rotate the pulsator in a low-speed high-torque mode.

9. The driving device of claim 7, wherein the electronic clutch is configured to, based on the operation mode being a dehydration mode, couple the outer shaft to the rotor and rotate the tub in a high-speed low-torque mode.

10. A driving device for a washing machine, comprising:

a shaft comprising an inner shaft and an outer shaft that surrounds the inner shaft;

a motor assembly comprising:
  a stator,
  a rotor that that surrounds the stator and that is configured to rotate relative to the stator,
  a modulator that surrounds the rotor, and
  a magnetic gear rotating body that surrounds the modulator, wherein the modulator is configured to adjust a rotating speed of the magnetic gear rotating body and a torque of the magnetic gear rotating body;

a first fixation body that connects the inner shaft to the magnetic gear rotating body, the first fixation body having a first end fixed to the magnetic gear rotating body and a second end fixed to the inner shaft;

a second fixation body that fixes the modulator to a tub of the washing machine, the second fixation body having a first end connected to the stator and a second end connected to the tub; and an electronic clutch that is configured to, according to an operation mode of the washing machine, disconnect the outer shaft from the rotor or connect the inner shaft to the rotor, wherein a distal end of the inner shaft is connected to a pulsator of the washing machine, and the outer shaft is connected to the tub, and wherein the rotor is disposed radially between the stator and the modulator, the rotor comprising:
  a first magnet that faces the stator, and
  a second magnet that is disposed radially outward relative to the first magnet and that faces the modulator.

11. The driving device of claim 10, wherein the motor assembly includes:

a first gap defined between the stator and the rotor;

a second gap defined between the rotor and the modulator; and a third gap defined between the modulator and the magnetic gear rotating body.

12. The driving device of claim 10, wherein the modulator comprises one or more electrical steel sheets.

13. The driving device of claim 12, wherein the magnetic gear rotating body comprises a plurality of magnets that face the modulator, that have different polarities from one another, and that are alternately arranged along a circumferential direction of the rotor.

14. The driving device of claim 13, wherein the modulator is configured to, based on adjusting the rotating speed and the torque of the magnetic gear rotating body, decrease a speed of the rotor and increase a torque of the rotor.

15. The driving device of claim 10, wherein the electronic clutch is configured to, based on the operation mode being a wash mode, disconnect the outer shaft from the rotor and rotate the pulsator in a low-speed high-torque mode.

16. The driving device of claim 10, wherein the electronic clutch is configured to, based on the operation mode being a dehydration mode, couple the outer shaft to the rotor and rotate the tub in a high-speed low-torque mode.

17. The driving device of claim 10, wherein the second fixation body comprises:

a stator fixer that is connected and fixed to the stator; and a modulator fixer that extends from the stator fixer and that fixes the modulator to the tub.

18. The driving device of claim 17, wherein the modulator fixer extends from the stator fixer toward the tub and is inserted between the rotor and the magnetic gear rotating body.

* * * * *